US012649262B2

(12) United States Patent (10) Patent No.: US 12,649,262 B2
Vieth et al. (45) Date of Patent: Jun. 9, 2026

(54) METHOD FOR RECYCLING POLYESTER

(71) Applicant: PHP FIBERS GMBH, Obernburg (DE)

(72) Inventors: Christian Vieth, Wörth (DE); Andreas Flachenecker, Essen (DE); Lukas Lacho, Senica (SK); Enrique Herrero Acero, Tulln an der Donau (AT)

(73) Assignee: PHP FIBERS GMBH, Obernburg (DE)

( * ) Notice: Subject to any disclaimer, the term of this patent is extended or adjusted under 35 U.S.C. 154(b) by 668 days.

(21) Appl. No.: 18/023,466

(22) PCT Filed: Sep. 2, 2021

(86) PCT No.: PCT/EP2021/074214

§ 371 (c)(1),
(2) Date: Feb. 27, 2023

(87) PCT Pub. No.: WO2022/049171

PCT Pub. Date: Mar. 10, 2022

(65) Prior Publication Data

US 2023/0256654 A1 Aug. 17, 2023

(30) Foreign Application Priority Data

Sep. 3, 2020 (EP) ..................................... 20194411

(51) Int. Cl.
*B29B 17/04* (2006.01)
*B29B 17/00* (2006.01)
*C08J 11/06* (2006.01)
*B29K 67/00* (2006.01)
*B29L 31/00* (2006.01)

(52) U.S. Cl.
CPC ...... *B29B 17/0412* (2013.01); *B29B 17/0026* (2013.01); *B29B 17/04* (2013.01); *C08J 11/06* (2013.01); *B29B 2017/046* (2013.01); *B29K 2067/003* (2013.01); *B29L 2031/731* (2013.01); *C08J 2367/02* (2013.01)

(58) Field of Classification Search
USPC .......................................................... 521/48
See application file for complete search history.

(56) References Cited

U.S. PATENT DOCUMENTS

2015/0076744 A1* 3/2015 Clark ...................... B29B 7/485
264/211.22

FOREIGN PATENT DOCUMENTS

| CN | 102605454 B | * | 3/2013 |
| DE | 216723 A1 | * | 12/1984 |
| DE | 19 953 659 A1 | | 5/2001 |
| EP | 0 942 035 A2 | | 9/1999 |
| EP | 0 994 146 A1 | | 4/2000 |
| WO | 2004/106025 A1 | | 12/2004 |

OTHER PUBLICATIONS

DD-216723-A1 Machine Translation (Year: 1984).*
CN102605454B Machine Translation (Year: 2013).*
Dec. 8, 2021 International Search Report issued in International Patent Application No. PCT/EP2021/074214.
Mar. 7, 2023 International Preliminary Report on Patentability issued in International Patent Application No. PCT/EP2021/074214.

* cited by examiner

*Primary Examiner* — Terressa Boykin
(74) *Attorney, Agent, or Firm* — Oliff PLC

(57) ABSTRACT

A method for producing filaments from polyester waste, having the steps of mechanically comminuting the polyester waste, post-condensing the comminuted polyester waste in the solid phase, melting the post-condensed polyester waste and extruding the melt in order to form filaments. Prior to carrying out the melting step for extrusion purposes, the method is completely carried out below the melting temperature of the polyester waste. The solution viscosity of the post-condensed polyester waste equals at least 1.7. Possible applications of the filaments according to the invention are, for example, reinforcement carcasses for vehicle tyres.

15 Claims, No Drawings

METHOD FOR RECYCLING POLYESTER

The invention relates to a method for recycling polyester or polyester waste, which enables a direct manufacturing route for the production of technical and/or tyre yarns from polyester waste.

Polymers from the polyester class, especially derivatives of terephthalic acid such as polyethylene terephthalate (PET) and polybutylene terephthalate (PBT), are important plastics and are used for various mass applications. Of particular importance is the production of lightweight, thin-walled disposable bottles made of polyethylene terephthalate ("PET bottles"), especially for beverages such as mineral water, lemonades or fruit juices. Polyester fibres are widely used both in the production of clothing fabrics and for technical applications such as the manufacture of airbags, seat belts, reinforcing textiles for conveyor belts or hoses, but also for the production of cords for the reinforcement of pneumatic vehicle tyres.

The widespread use of polyesters, especially for short-lived everyday items such as disposable bottles, generates large amounts of polyester waste, which is collected in many countries by means of deposit systems for disposable beverage containers. In addition, disused reusable bottles are collected that are made of polyesters. Large quantities of so-called "spinning waste" or "fiber fluff" are produced in the production of polyester fibres. This refers to fibre material that is produced at the beginning of a spinning process but cannot be used as yarn for technical reasons. Spinning waste can be collected and recycled. From discarded tires, not only rubber and metal can be recovered. Recovery of the reinforcing carcass, which in many cases contains polyester, is also commonly practised.

The recycling of polyesters is possible in principle because polyester can be liquefied by melting and transformed into new forms. However, there are two major obstacles to such a recycling process.

The first major obstacle is varietal purity. Recycling of mixtures of different types of polyester waste is only possible to a very limited extent because polyester can have different compositions for different uses. Polyester for tyre applications, for example, is often very pure and consists of very long-chain polyethylene terephthalate. The long, very regular chains show a great tendency to crystallise and thus to form particularly tear-resistant fibres. This obstacle can be overcome by sorting or unmixed collection of polyester waste, as is done, for example, in the collection of disposable bottles. The collection of spinning waste can also involve varietal separation. In addition, vehicle components such as seat belts and airbags are a source of polyester waste, as are other technical textiles. Mixing waste from different sources, on the other hand, can be problematic, as the polyethylene terephthalate may have different compositions depending on the source. For example, bottles are usually made from a polyethylene terephthalate in which up to 2 percent of the terephthalic acid is replaced by isophthalic acid and/or 1,4-cyclohexanedimethanol in order to achieve better transparency.

The second obstacle is quality loss due to polymer degradation during the use phase and/or mechanical recycling. Unlike glass and many metals, for example, which can be recycled almost infinitely without loss of quality, polyester recycling was for a long time always so-called "downcycling"—recycled polyester could only be used to make products that were of lower quality and value than the original products. The polymer chains in polyester are exposed to hydrolysis under the influence of light, water, atmospheric oxygen and thermal stress, which leads to continuous chain shortening and thus to decreasing mechanical strength of the product. In general, the requirements for the chain length and mechanical strength of polyester fibres depend heavily on the desired area of application. One general measure of chain length is the solution viscosity of the polymer according to DIN EN ISO 1628-1-2012-10. An application for the production of clothing fabrics usually requires only a low strength of the fibres. Fibres made from a polymer with a solution viscosity of around 1.6 are sufficient here. The strength requirements are higher for fibres used in the production of so-called technical yarns which are used to make reinforcing fabrics for hoses or conveyor belts are made, for example. Solution viscosities of at least 1.8 are required here. The highest strength requirements apply to fibres used in the production of reinforcing carcasses for vehicle tyres. Solution viscosities of at least 2.0 are required here.

The susceptibility of polyester to hydrolysis is due to its molecular structure. In a polyester macromolecule within the meaning of the present application, dicarboxylic acid residues and dialcohol residues are linked together by ester bonds, which are formed in a polycondensation reaction with elimination of water molecules. The presence of water, especially at elevated temperatures and/or the simultaneous presence of bases or strong acids, leads to bonds being broken with the addition of water molecules and to the formation of free carboxylic acid and alcohol groups. This leads to a shortening of the polymer chains of the polyester.

Due to hydrolysis effects, the structure of products made of polyester is generally far less durable under environmental conditions than that of products made of glass or metals, for example. If such a product is now subjected to recycling at the end of its life, which, in addition to possible cleaning and drying, involves at least a melting process and renewed shaping and thus contact with water, cleaning agents and a further thermal load, the hydrolysis is accelerated even further and the result is inevitably a product of inferior quality. The highly tear-resistant yarns of a tyre carcass can possibly only be used to produce a non-woven fabric for the textile industry. This is even more the case because the manufacture of the product from recycled plastic may not be carried out by melting it once, but rather a raw product, for example a granulate, is first produced by melting, which is then melted again in a further step and processed into the product. The consequence is that the polymer chains that make up the polyester of the recycled product are shorter than those that previously made up the initial product—with all the consequences this entails in terms of mechanical and also thermal stability.

As a measure of the progress of hydrolysis of a polyester sample, the so-called carboxyl end group (CEG) content is determined according to ASTM D7409-07, which indicates how many free carboxyl groups, formed by hydrolysis of the polyester chains, are present per unit mass of the sample.

In order to increase the length of the polymer chains in both freshly produced and recycled polyester, the method of post-condensation is available, in which the solid polyester processed into a defined granulate or a polyester melt is kept at higher temperatures under reduced pressure and/or inert gas for an extended period of time. The high temperature accelerates the polycondensation reaction between free alcohol groups and carboxylic acid groups and an inert gas flow and/or reduced pressure removes the reaction products of the polycondensation such as water vapour from the reaction equilibrium, thereby causing the linking of shorter polyester chains to longer polyester chains.

The properties of recycled polyester products are also affected by the fact that the recycled feedstock is often contaminated by items adhered thereto, or that the polyester being recycled contains additives that improve the properties of the original product but are disruptive in the recycled product. Examples include lubricants (so-called spinning oils) applied to synthetic fibres, which improve the mechanical properties of the fibres, or coatings on the material of bottles for carbonated drinks, which reduce gas permeability. In addition to influencing the mechanical properties of the recycled polyester, the potential toxicity of such impurities is also a factor, especially if the recycled material is to be used to produce food packaging, textiles or toys, for example.

EP 0942035 discloses a process and an apparatus for the recovery of high-quality polyester with low system size and energy consumption. For recycling, undried waste is fed into an extruder, where hydrolytic degradation occurs in the melt. A polyhydric alcohol corresponding to the basic building block for the polymer to be treated is added to the melt, and the melt is post-condensed in a reactor to the desired degree of polycondensation for processing. A final degree of polymerisation between about 150 and 200 can be set. Waste in the form of bottle scrap, fibres and threads, foils and tiles, etc. can be fed into the process described. The melt obtained can be spun into threads for technical applications.

WO 2004/106025 discloses a process for food-grade recycling of polyethylene terephthalate, wherein the polyester waste to be recycled is dried, melted and processed into a granulate. The granulate is then subjected to a crystallisation step and a solid phase post-condensation. The recycled product obtained can then be used to produce packaging such as beverage bottles.

The prior art lacks a method for producing polyester filaments suitable for the production of reinforcing carcasses for tyres.

The object of the present invention is to provide a recycling method for polyester that enables polyester waste to be processed into products of higher value than the starting materials of the recycling. The focus here is on the production of highly tear-resistant filaments from polyester waste, ideally filaments that are suitable for the production of reinforcement carcasses for tyres.

The object is achieved by a method for producing filaments from polyester waste, having the steps of mechanically comminuting the polyester waste into chips, post-condensing the comminuted polyester waste, melting the post-condensed polyester waste and extruding the melted polyester waste to form filaments, characterised in that the method is completely carried out below the melting temperature before the post-condensed polyester waste is melted, and in that the solution viscosity of the post-condensed polyester waste equals at least 1.7 according to DIN EN ISO 1628-1-2012-10.

Implementation below the melting temperature allows the method to be carried out under mild reaction conditions, which prevents further hydrolysis of the polyester in the course of the recycling process and thus makes the recycling process both particularly low-impact and particularly efficient at the same time. In addition, energy can be saved in this way.

By saving energy and also by saving on the equipment required for melting and granulating, the process can be designed not only to be environment-friendly, but also particularly economical.

Filaments within the meaning of the present application are structures whose length is a multiple of their thickness.

The term "filaments" can therefore be understood to mean all types of fibres. In particular, however, filaments are understood to be fibres of a particularly long length. A typical filament has a length of one metre or more, but the length can also be several hundred and even several thousand metres. This makes it conceivable, for example, that the content of a complete yarn reel consists of only a single filament.

For the purposes of the application, polyesters are to be understood as polymers in which the building blocks of terephthalic acid, isophthalic acid or phthalic acid are linked together by dihydric or polyhydric alcohols. Examples of dihydric alcohols include ethylene glycol, 1,3-propanediol or 1,4-butanediol, which together with terephthalic acid form the polymers polyethylene terephthalate (PET), polytrimethylene terephthalate (PTT) and polybutylene terephthalate (PBT). Besides polymers consisting of only one acid and one alcohol component, copolymers containing two or more different acid components and/or two or more different alcohol components also play a role. For example, copolymers of ethylene glycol, terephthalic acid and isophthalic acid are conceivable. Polyester used for bottles, for example, is often polyethylene terephthalate in which up to two percent by weight of the terephthalic acid is replaced by isophthalic acid and/or 1,4-cyclohexanedimethanol. This reduces the tendency of the polyethylene terephthalate to crystallise, thus achieving a particularly high degree of transparency.

Surprisingly, it has now been shown that polyethylene terephthalate with an isophthalic acid content of up to three percent by weight in particular is capable of forming very tear-resistant fibres that are also suitable for use in tyre reinforcements.

For the purposes of the present application, percent by weight does not mean the proportion of the molecular monomer in the polymer, but the proportion of the corresponding monomer unit in the polymer chain and thus in the total mass of the polymer, based on the assumption that all chains of the polymer have the same statistical composition. A "monomer unit" is understood to be the contribution of the monomer to the polymer chain. For the purposes of the present application, the contribution of the dialcohol to the polymer chain (e.g. of ethylene glycol) is the dialcohol molecule without the hydrogen atoms of the hydroxyl groups. The contribution of the ethylene glycol molecule to the polymer chain of the polyester thus has the molecular formula $C_2H_4O_2$. The amount of the dicarboxylic acid to the polymer chain of the polyester (e.g. of terephthalic acid or isophthalic acid) is the dicarboxylic acid molecule without the OH groups of the two carboxyl groups. The contributions of terephthalic acid and isophthalic acid to the repeating unit of the polyester molecule thus both have the molecular formula $C_8H_4O_2$. In a polyester containing 2 percent by weight of isophthalic acid, the contribution of the monomer unit of isophthalic acid to the mass of the total polymer is therefore 2 percent.

For the purpose of this application, polyester waste means any goods containing at least 80 percent by weight of polyester which are sent for disposal because they have either fulfilled their purpose, have proved unsuitable or no longer suitable for fulfilling their purpose or have exceeded their service life. Polyester waste can be, for example, empty packaging, e.g. disposable or reusable bottles, reinforcement carcasses of worn tyres or discarded pre-run and/or post-run material from the production of goods such as polyester fibres. The disposal of polyester waste can be understood as permanent storage, e.g. landfilling, destruction, e.g. by incineration, or material reuse, i.e. recycling.

The recycling of polyester waste within the meaning of the present application thereby begins with a mechanical comminution step, the aim of which is to bring the polyester waste to a size in which it can be easily transported, e.g. with the aid of suction lifters or conveyor belts, in which it is pourable and in which it is not capable of clogging pipelines, reaction or storage vessels, for example. Furthermore, the comminution step increases the contact area of the polyester waste with the surrounding atmosphere, which is of great importance for the kinetics of chemical reactions during the recycling process. The comminution step must be distinguished from any coarse mechanical deformation or cutting processes that may already have been carried out on the polyester waste in advance, such as crushing, tearing, cutting, breaking or smashing, which serve to compact the polyester waste, for example. Devices for comminuting polyester waste are known to the person skilled in the art. In this context, cutting mills, hammer mills or roller cutting mills are to be mentioned, for example. The polyester waste is processed into chips by these or similar devices. Polyester waste which consists of a substantial proportion of polyester fibres can furthermore be processed by cutting systems into fibre chips, as are also used for the production of staple fibres. The comminution step can be carried out at reduced pressure and/or under inert gas, such as nitrogen, carbon dioxide or argon. In order to ensure the uniform conduct of chemical reactions during the recycling process, it is of interest that the chips fed into the process have a size distribution as narrow as possible. On the one hand, this can be done by selecting a suitable device for shredding polyester waste; on the other hand, setting the narrowest possible size distribution is also conceivable by sizing the chips. For this purpose, for example, the use of one or more sieves or the use of a sifter, e.g. an air sifter can be considered which separates chips of different sizes from each other based on their drifting through an air stream. Chips that have been sorted out as too large during the sizing process can, if necessary, pass through the plastic waste shredding device again to be brought to a size that is compatible with the process. In one embodiment, the chips are in the form of rectangular plates with dimensions in the range between 8 and 12 millimetres. In one embodiment, a maximum of 0.05 percent of the chips deviate from these dimensions by more than one millimetre. In one embodiment, the proportion of chips that deviate from these dimensions by more than one millimetre is negligible. In one embodiment, polyester fibres are cut into chips of an average length of 8-12 millimetres. In one embodiment, the proportion of chips that deviate from this length by more than one millimetre is negligible.

To avoid sticking and further chain shortening due to accelerated hydrolysis, mechanical comminution is completely carried out below the melting temperature of the polyester waste.

In order to free the chips from adhesive soiling, a cleaning step can follow which can be designed differently depending on the type of soiling.

The soiling of polyester waste that contains beverage bottles, for example, will essentially consist of beverage residues, but also of their derived products created in the course of disposal, such as mould, bacterial slime and/or insect larvae. In this case, cleaning with water and surfactants would seem to be effective, which can be carried out at elevated temperatures and/or with the addition of biocides such as fungicides, bactericides or insecticides to effectively kill all kinds of organisms. Suitable surfactants and biocides are known to the person skilled in the art. The cleaning step usually means a high chemical load for polyesters and accelerates the hydrolysis of the polymer chains because the increased temperatures in combination with water and often alkaline reacting surfactants strongly attack the ester bond in polyesters.

The soiling of polyester waste containing spinning waste consists essentially of applied avivages known as "spin finish". These can be, for example, siloxanes or paraffin oils, stabilisers, antistatic agents and/or mixtures of two or more of the substances mentioned.

Polyester waste containing reinforcement carcasses from discarded tyres must first of all be freed of adhesive rubber residues and, if necessary, bonding agents.

Polyester waste obtained by recycling airbags usually has to be freed of elastomer coatings.

To avoid sticking and further chain shortening due to accelerated hydrolysis, the cleaning step is completely carried out below the melting temperature of the polyester waste.

The possible cleaning step is expediently followed by a drying step, in the course of which the cleaned chips are freed of water or solvents. The drying step may be carried out under reduced pressure, in an inert gas stream such as a nitrogen stream, an argon stream or a carbon dioxide stream, and/or at elevated temperature, and/or by a combination of two or more of the above.

A drying step can also be useful under certain circumstances if no cleaning of the chips was necessary, but the water content of the chips is too high for the recycling process, e.g. due to storage under the influence of the weather or in humid air. It is also known to the person skilled in the art that the water content of polyester chips is of crucial importance to the degree of crystallisation of the polymer, i.e. the degree of order of the polymer chains. The degree of crystallisation, in turn, has a clear influence on the efficiency of the post-condensation of the chips. In order to enable efficient post-condensation of the chips, a degree of crystallisation of 30 to 40 percent is desirable, which can be set by means of storage at defined temperature, pressure and humidity conditions.

To avoid sticking and further chain shortening due to accelerated hydrolysis, the drying step is completely carried out below the melting temperature of the polyester waste.

Following the drying step, the chips can undergo an intermediate shaping step which serves to standardise their size and dimensions. It is conceivable here, for example, to melt the chips and extrude the melt into new chips that have a uniform shape and size, as can be achieved, for example, by shaping with underwater pelletisers. Between melting and extrusion, the melt can also be freed of undesired admixtures such as sand and other impurities, but also of unmelted polymer components, by means of filtration.

Filtration can be carried out in a multi-stage process and/or make use of multi-layer filters. In one embodiment, two-layer filters are used. In a further embodiment, three-layer or multi-layer filters are used.

The filters used to filter the polymer melt have a pore size of 40 µm or less. In one embodiment, the filters used have a pore size of 30 µm or less. In one embodiment, the filters used have a pore size of 20 µm or less. In one embodiment, the filters used have a pore size of 10 µm or less.

The chips, which will possibly have been cleaned and dried, are then subjected to post-condensation in the solid phase. During post-condensation, a polycondensation reaction takes place between acid- and alcohol-terminated polymer chain fragments, which leads to an elongation of the chains. Post-condensation is thus able to compensate for the shortening of polymer chains caused by environmental conditions, so that a product of the same quality as the original product can be made again from the recycled material. If the post-condensation is carried out for a sufficiently long time, it is also possible to subsequently create a product from the recycled material that is of higher quality than the original product. For example, it is possible to subsequently produce yarns for the manufacture of reinforcing carcasses for vehicle tyres from chips made from bottles. It has been shown that the yarns produced in this way still meet the strength requirements for tyre yarns even if they contain up to three weight percent isophthalic acid.

The average length of the polymer chains of the recycled polyester is of crucial importance in terms of the mechanical strength of the product made from it, namely the fibres made from it. One key parameter for the mechanical strength of polyester fibres is the dimensionless solution viscosity of the polyester used, which is determined according to DIN EN ISO 1628-1-2012-10. The solution viscosity of the polyester allows the polyester to be categorised for the application. For example, polyesters with a solution viscosity above 1.6 are used for the production of clothing fabrics. Polyesters with a solution viscosity above 1.8 are used for the production of sewing threads as well as for technical applications, for example as reinforcing fabrics for conveyor belts or hoses, but also for the production of beverage bottles. Polyesters with a solution viscosity above 2.0 are used for the production of reinforcing carcasses for vehicle tyres.

Post-condensation, in which the chips are exposed to temperatures below their melting point for a longer period of time, allows the solution viscosity of the polyester material to be adjusted as a function of reaction time and reaction temperature. The chemical reactions on which post-condensation is based are known to the person skilled in the art. Depending on whether a terminal acid group and a terminal alcohol group or a terminal ester group and a terminal alcohol group react with each other, an ester formation or a transesterification reaction occurs in which a molecule of water or a molecule of alcohol (e.g. ethylene glycol or methanol) is split off. These comparatively volatile reaction products evaporate at the reaction temperature of the post-condensation. An inert gas flow to which the chips can be exposed during post-condensation favours the removal of the gaseous reaction products from the reaction environment. Nitrogen, carbon dioxide or argon can be used as inert gases. Similarly, evaporation of the reaction products can be facilitated by means of reduced pressure. The temperature, pressure and reaction time of the post-condensation can be adjusted depending on the particle size and in advance of certain characteristics of the chips such as their solution viscosity and their carboxyl end group content.

Post-condensation can take place at a temperature of approx. 220° C. Post-condensation can take place at a pressure of approx. 15 bar. Advantageously, the post-condensation is carried out above the crystallisation temperature of the chips so as to allow movability of the polyester chains against each other. Post-condensation is carried out below the melting temperature to prevent liquefaction or sticking of the chips during post-condensation.

Post-condensation can take place continuously in a shaft in which a heated inert gas stream, for example a nitrogen, carbon dioxide or argon stream, flows permanently through the chips, whereby care must be taken to ensure that the inert gas stream has as low a water content as possible. Constant movement of the chips, for example through turbulence by the gas flow, counteracts sticking of the chips and also facilitates the diffusion of gaseous products of the polycondensation reaction such as water vapour.

Post-condensation can be carried out in batches in a tumble dryer. For this purpose, a tumble dryer is filled with chips, placed under an inert gas atmosphere, for example nitrogen atmosphere, carbon dioxide atmosphere or argon atmosphere, if necessary at reduced pressure, and set in motion. The movement of the tumble dryer leads to a permanent movement and mixing of the chips, which on the one hand prevents the chips from sticking together and on the other hand facilitates the diffusion of gaseous products of polycondensation such as water vapour.

Once the desired solution viscosity has been reached, the post-condensation can be stopped.

If a drying step and/or a crystallisation step is necessary before post-condensation, one or more of these steps can be combined by varying temperature and/or pressure parameters during the treatment, for example, to first carry out drying and/or crystallisation, which then lead directly to post-condensation, in particular without transfer to another reactor. In this context, a reactor is to be understood as any type of container in which processes can be carried out within the scope of the method according to the present application and in which the solid, comminuted polyester waste can be moved and mixed if necessary. In particular, this is understood to mean the containers in which the post-condensation is carried out.

In one embodiment, the method according to the application is carried out in such a way that the polyester waste is not heated above its melting temperature until the end of the post-condensation.

Following post-condensation, the polyester waste is melted. The melt can be freed of undesired admixtures such as sand and other impurities, but also of non-melted polymer components, by means of filtration.

Filtration can be carried out in a multi-stage process and/or make use of multi-layer filters. In one embodiment, two-layer filters are used. In a further embodiment, three-layer or multi-layer filters are used.

The filters used to filter the polymer melt have a pore size of 40 µm or less. In one embodiment, the filters used have a pore size of 30 µm or less. In one embodiment, the filters used have a pore size of 20 µm or less. In one embodiment, the filters used have a pore size of 10 µm or less.

The melt is spun into filaments by means of extrusion. For this purpose, the melt is pressed through a spinneret into a spinning channel in which the emerging melt jets are cooled. Cooling can be carried out by a stream of cold air.

The spinning process can be followed by a drawing process. In the drawing process, the spun filaments are guided over a draw frame with two or more godets, whereby the rear godet has a higher running speed than the front godet. The draw ratio corresponds to the ratio of the running speed of the godets. Between the two godets, the filaments can be passed through a heated water bath or oven to heat them to a temperature above the glass temperature of the polyester. It is also possible to heat the filaments on the godets via an internal godet heater.

The drawing process can be continuous or discontinuous. In a continuous drawing process, the filaments are fed directly from the spinning channel over the godets, drawn and then wound up. In a discontinuous drawing process, the filaments are fed from the spinning channel directly onto a coil. The full coil is then inserted into a drawing unit where the filaments are unwound again, drawn and rewound.

The present application also relates to a yarn comprising filaments produced by the method described in the application.

Following the drawing process, the filaments can be combined into yarns. Such a yarn may consist of several filaments running in parallel. Such a yarn may consist of several filaments running parallel and welded together at regular intervals. Such a yarn may consist of filaments twisted together.

The polyester forming the yarn according to the application typically has a carboxyl end group content of less than 35 mmol/kg. In further embodiments, the carboxyl end group content is less than 31 mmol/kg, less than 30 mmol/kg or less than 28 mmol/kg.

In addition to ethylene glycol and terephthalic acid, the polyester forming the yarn according to the application may also contain up to 3 percent by weight of isophthalic acid. In further embodiments, the isophthalic acid content is up to 2 percent by weight or up to 0 percent by weight.

In one embodiment, the yarn according to the present application has a tensile strength of at least 50 cN/tex. In a further embodiment, the tensile strength is above 60 cN/tex, above 70 cN/tex, above 80 cN/tex or above 100 cN/tex.

In one embodiment, the relative solution viscosity of the polyester forming the yarn according to the present application equals at least 1.97. In one embodiment, the relative solution viscosity of the polyester forming the yarn according to the present application equals at least 1.95.

Depending on their strength values, yarns according to the present application can be used as sewing yarns, as reinforcing fabrics for conveyor belts or hoses, or for the production of cords.

The present application also relates to a cord comprising one or more yarns according to the present application.

Cords are thread-like structures consisting of one or more yarns, whereby the filaments of the yarns and/or the yarns are twisted together.

Cords according to the present application can be used for the production of cord fabrics for reinforcing carcasses of vehicle tyres.

The invention claimed is:

1. Method for producing filaments from polyester waste, having the steps of
   a. mechanically comminuting the polyester waste,
   b. post-condensing the comminuted polyester waste in the solid phase,
   c. melting the post-condensed polyester waste, d. extruding the melt in order to form filaments,
wherein
   prior to the melting step (c), the method is caried out entirely below the melting temperature of the polyester waste, and
   the solution viscosity of the post-condensed polyester waste equals at least 1.7 according to DIN EN ISO 1628-1:2012-10.

2. Method according to claim 1, wherein the solution viscosity of the post-condensed chips according to DIN EN ISO 1628-1-2012-10 equals at least 2.0.

3. Method according to claim 1, wherein one of the method steps a and/or b is carried out under inert gas atmosphere and/or at reduced pressure.

4. Method according to claim 1, wherein the polyester waste is cleaned and/or dried prior to post-condensation.

5. Method according to claim 1, wherein the filaments are drawn after melt spinning.

6. Method according to claim 1, wherein the polyester waste comprises polyethylene terephthalate.

7. Method according to claim 1, wherein the polyester waste contains bottles.

8. Method according to claim 1, wherein the polyester waste contains spinning waste.

9. Method according to claim 1, wherein the polyester waste contains seat belts, airbags and/or other technical textiles.

10. Method according to claim 1, wherein the polyester waste contains tire carcasses.

11. Method according to claim 1, wherein the post-condensed polyester waste has a degree of crystallization of at least 30 percent.

12. Yarn for reinforcing purposes comprising at least one filament produced by the method of claim 1, said yarn having a strength of at least 80 cN/tex.

13. Yarn according to claim 12, wherein the polyester contained in the yarn contains up to 3 percent by weight isophthalic acid.

14. Yarn according to claim 12, wherein the polyester contained in the yarn has a relative solution viscosity of 1.95 or more.

15. Cord comprising at least one yarn according to claim 12.

* * * * *